Figure 1:
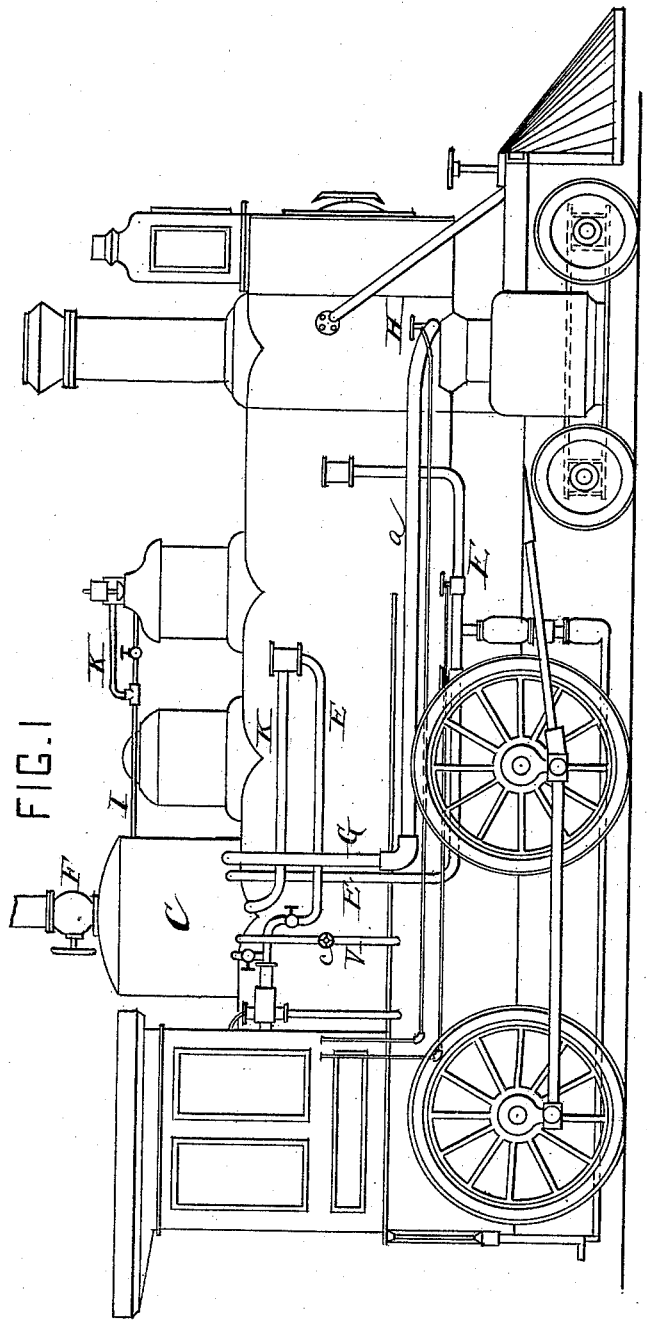

(No Model.)

2 Sheets—Sheet 1.

O. ROTHROCK.
FEED WATER HEATER.

No. 328,903.  Patented Oct. 20, 1885.

Witnesses
Harry J. Rohrer
John Enders Jr.

Inventor
Oscar Rothrock
Duffy & Brashears
Atty's (No Model.) 2 Sheets—Sheet 2.
O. ROTHROCK.
FEED WATER HEATER.
No. 328,903. Patented Oct. 20, 1885.
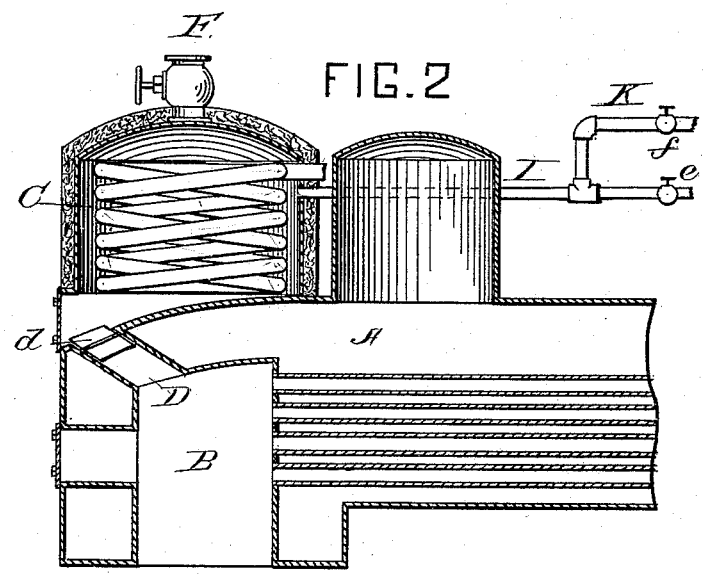
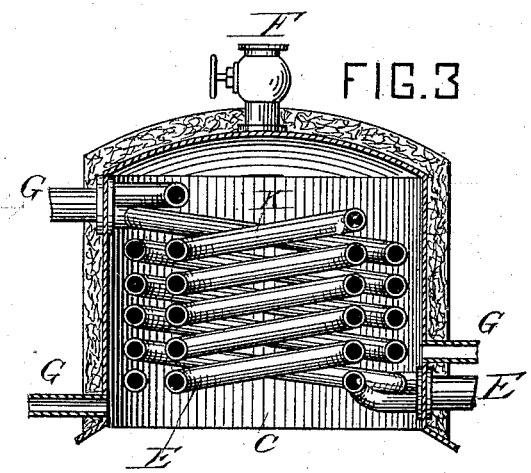
Witnesses:
Harry J. Rohrer
John Enders Jr
Inventor
Oscar Rothrock

UNITED STATES PATENT OFFICE.

OSCAR ROTHROCK, OF NEW YORK, N. Y.

FEED-WATER HEATER.

SPECIFICATION forming part of Letters Patent No. 328,903, dated October 20, 1885.

Application filed September 8, 1885. Serial No. 176,519. (No model.)

*To all whom it may concern:*

Be it known that I, OSCAR ROTHROCK, of New York city, in the county of New York and State of New York, have invented certain new and useful Improvements in Feed-Water Heaters for Steam-Boilers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to feed-water heaters for locomotives, stationary and other boilers, but is especially adapted to locomotives or portable engines.

Its object is to supply steam-boilers with feed-water of a high temperature by utilizing the waste heat from the combustion-chamber, the exhaust-steam, and the waste steam from the safety-valve.

The present invention is a division of the device for which I made application for patent June 9, 1885, Serial No. 168,167, in which a tank containing water is heated by the heat of the furnace, also by the exhaust-steam passing through a coiled pipe within the tank.

My new improvement consists of a chamber similarly situated, into which the exhaust-steam from the engine, the waste steam from the safety-valve or live steam from the boiler, and the heat from the furnace may enter separately or altogether and heat the water, that passes through one or more coiled pipes within the chamber.

It also consists of minor details of construction, which will be hereinafter described, and particularly pointed out in the claims.

Referring to the drawings, Figure 1 is a side elevation of a locomotive with my heater in position. Fig. 2 is a longitudinal vertical section of the boiler and heater, and Fig. 3 is a vertical cross-section of the heater.

A is the boiler, and B the furnace. Upon the boiler and over the furnace is secured in any well-known manner a dome or chamber, C, that communicates with the furnace by a passage, D. The heat from the furnace through the passage being controlled by the valve *d*, this connection with the furnace may be closed by the valve in certain cases and the exhaust-steam used alone in heating the water. The chamber is covered with some well-known non-conductor of heat.

Within the chamber are one or more coils of pipes, E, through which the water is fed to the boiler. On top of the chamber is a valve, F, for regulating the escape of exhaust-steam, thereby preventing any backdraft through the passage D. Entering each side of the chamber are pipes G, leading from the exhaust-nozzle in the smoke-box at the forward part of the engine, the exhaust being controlled by the valve H to either enter the heater or exhaust up the stack.

G is the pipe carrying water, which may enter either at the top or bottom, as desired. *v* is the drip-pipe and its cock for use when the furnace-opening is omitted.

Entering the forward side of the chamber is a pipe, I, through which live steam may be permitted to pass from the steam-drum by opening the valve *e*. From this pipe a branch pipe, K, that may or may not be provided with a valve, *f*, leads to the safety-valve, so that the waste steam may enter the chamber to heat the water, and also to muffle the steam and thus prevent the usual disagreeable noise incident to blowing off.

The valves can all be placed under the control of the engineer by the usual rods and levers.

From the foregoing description it will be readily seen that a superior water-heater for boilers is constructed, and in which the waste heat from the escaping steam and of the furnace is utilized.

What I claim, and desire to secure by Letters Patent, is—

1. In a feed-water heater, the combination of a boiler-furnace, a chamber above the furnace, a passage leading from the furnace to the chamber, a valve within the passage, and coiled water-pipes within the chamber, substantially as shown and described.

2. In a feed-water heater, the combination of a boiler-furnace, a chamber above the furnace, a passage leading from the furnace to the chamber, coiled water-pipes within and exhaust-steam pipes leading into the chamber, substantially as described, 3. In a feed-water heater, the combination of a boiler-furnace, a chamber above the furnace, a passage leading to the chamber from the furnace, a valve controlling the passage, coiled water-pipes within the chamber, and waste-steam pipes leading into the said chamber, substantially as described.

In testimony that I claim the foregoing as my own I affix my signature in presence of two witnesses.

OSCAR ROTHROCK.

Witnesses:
E. J. DOHERTY,
E. G. TUCKERMAN.